United States Patent
Rasimus

(10) Patent No.: US 6,316,893 B1
(45) Date of Patent: Nov. 13, 2001

(54) METHOD AND ARRANGEMENT FOR ADAPTIVE LOAD CHANGE COMPENSATION

(75) Inventor: Heikki Rasimus, Savonlinna (FI)

(73) Assignee: ABB Industry Oy, Helsinki (FI)

( * ) Notice: Subject to any disclaimer, the term of this patent is extended or adjusted under 35 U.S.C. 154(b) by 0 days.

(21) Appl. No.: 09/314,892

(22) Filed: May 19, 1999

(30) Foreign Application Priority Data

May 20, 1998 (FI) ......................................................... 981131

(51) Int. Cl.[7] ...................................................... H02P 7/00
(52) U.S. Cl. .......................... 318/432; 318/254; 318/434; 318/430; 318/609; 318/610; 388/815
(58) Field of Search ..................................... 318/432, 254, 318/434, 430, 609, 610; 388/815

(56) References Cited

U.S. PATENT DOCUMENTS

| | | | |
|---|---|---|---|
| 5,263,113 | * 11/1993 | Naitoh et al. ........................ | 388/815 |
| 5,467,004 | * 11/1995 | Matsuo et al. ....................... | 318/807 |
| 5,545,957 | * 8/1996 | Kudo et al. .......................... | 318/432 |
| 5,650,700 | * 7/1997 | Mutoh et al. ........................ | 318/432 |
| 5,666,034 | * 9/1997 | Seoung et al. .......................... | 318/6 |
| 5,994,868 | * 11/1999 | Takeuchi et al. .................... | 318/616 |

* cited by examiner

*Primary Examiner*—Robert E. Nappi
*Assistant Examiner*—Tyrone Smith
(74) *Attorney, Agent, or Firm*—Dykema Gossett PLLC

(57) ABSTRACT

A method and arrangement for adaptively compensating for load changes, particularly in connection with an electric motor drive which comprises a motor, the shaft of the motor being connected to a load (3) having a known moment of inertia; a device (2), such as an inverter, to control the motor, a torque controller being arranged in connection with the device; and a speed controller (1) arranged to control the speed of the motor. The method comprises steps of determining, during the load change, an estimate ($M_h$) for an external torque disturbance which causes load changes, and employing the torque disturbance estimate ($M_h$) determined during the previous load change for compensating for the external torque disturbance in controlling the torque of the motor.

13 Claims, 1 Drawing Sheet

METHOD AND ARRANGEMENT FOR ADAPTIVE LOAD CHANGE COMPENSATION

BACKGROUND OF THE INVENTION

The present invention relates to a method of adaptively compensating for load changes, particularly in connection with an electric motor drive which comprises a motor, the shaft of the motor being connected to a load having a known moment of inertia; a device, such as an inverter, to control the motor, a torque controller being arranged in connection with the device; and a speed controller arranged to control the speed of the motor.

The present electric motor drives enable a load to be controlled with great precision. For instance, the angular speed or the torque that is acting on the shaft of the motor can be made to keep the desired value quite accurately. Particularly in speed-controlled groups provided with several motors that are interconnected in one way or another, it is extremely important to keep the angular speed of each motor of the group under strict control. Such a speed-controlled group can be a cylinder group of a paper machine, for example. The speed of the rotating rolls of the cylinder group should be controlled such that the speed of the paper web running between the rolls remains the same at each roll.

When a speed-controlled group is subjected to a load change, the speed of the rotating rolls changes from its set value, in which case the speed controller of the motor drive reacts and, eventually, corrects the speed by returning it to the set value. In connection with paper machines, load changes affecting the web speed are caused for instance by cleaning doctor blades of cylinders pressing against the rolls, blades of coating stations pressing against backing rolls, and various closing nips, i.e. rolls that are pressed against each other. When the load of a motor drive increases, for instance when a cleaning doctor is pressed against a roll, the speed of the drive tends to drop. In the opposite situation, in other words when, for example, the cleaning doctor departs from the surface of the roll, the speed of the drive tends to increase. In connection with paper machines, when the paper web runs between the rolls, abrupt uncompensated changes in speed also affect the web tension of the paper in the machine direction.

Previously known attempts to compensate for predictable load changes employ a method of adding an experimentally determined additional command to the torque commands of an electric motor drive at a suitable moment. Such a procedure for compensating for load changes is, however, rather inefficient since it is difficult to determine a suitable additional torque command. Furthermore, load changes vary in magnitude and time of occurrence owing to mechanical wear and changing delays.

BRIEF DESCRIPTION OF THE INVENTION

An object of the present invention is to provide a method which avoids the disadvantages described above and enables load changes to be compensated in a more reliable manner. This object is achieved by the method of the invention, the method being characterized by determining, during the load change, an estimate ($M_h$) for an external torque disturbance which causes the load change, and employing the torque disturbance estimate ($M_h$) determined during the previous load change for compensating for the external torque disturbance in controlling the torque of the motor.

The method of the invention is based on the idea that during a load change, it is possible to determine a torque compensation which can be utilized in connection with the next load change to compensate for a corresponding torque disturbance. The advantages of the invention are fast and reliable adaptation to predictable load changes, and the reliable load change compensation provided by the method.

The invention further relates to an arrangement for adaptively compensating for load changes, particularly in connection with an electric motor drive which comprises a motor, the shaft of the motor being connected to a load having a known moment of inertia; a device, such as an inverter, to control the motor, a torque controller being arranged in connection with the device; and a speed controller arranged to control the speed of the motor, the speed controller receiving as its input a difference of a speed command and an actual value of the speed of the motor from an adder unit. The arrangement is characterized by comprising a compensator arranged to determine a torque compensation for compensating for an external torque disturbance on the basis of a torque disturbance to which the load is subjected, an output torque of the device controlling the motor, and a moment of inertia and an angular speed of the load.

By means of such an arrangement, the advantages of the method of the invention can be achieved by a simple and reliable structure.

BRIEF DESCRIPTION OF THE DRAWINGS

The invention is now described in closer detail in connection with the preferred embodiments with reference to the accompanying drawing, in which.

DETAILED DESCRIPTION OF THE INVENTION

Figure 1:
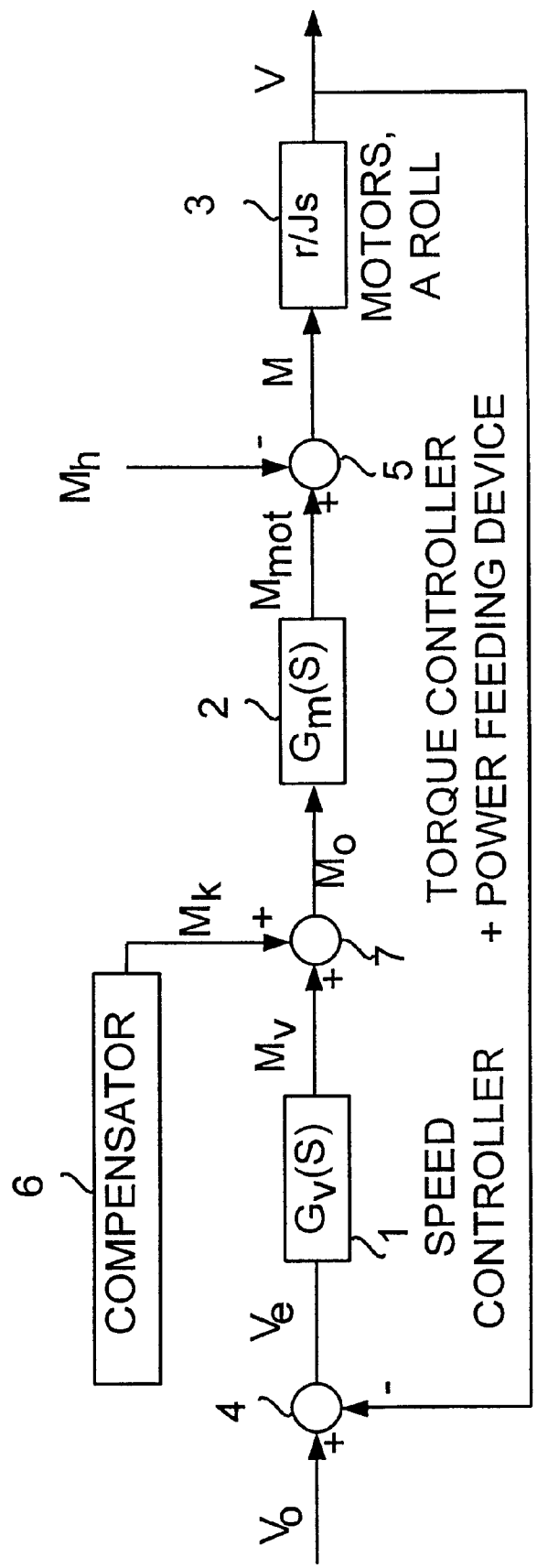
FIG. 1 is a block diagram showing a speed-controlled group of the invention.

The block diagram of FIG. 1 schematically shows a solution of the control technique of the method of the invention. In accordance with the invention, an electric motor drive comprises a controllable motor which has, by way of example, a roll 3 as its load on the shaft. The rotating speed of the roll is to be controlled as precisely as possible irrespective of changes in the load. The drive further comprises a speed controller 1, and a combination 2 of a torque controller and a power feeding device. The device can be, for example, an inverter with readily controllable dynamic characteristics, enabling a fast implementation of the torque command by the torque controller. The motor drive further performs the determination of an angular speed $\omega$ of the roll. In the figure, the angular speed is converted into a web speed v by multiplying the angular speed by a radius r of the roll. The web speed v is fed back to an adder unit 4, which forms a difference value $v_e$ of a command value $v_o$ and the actual web speed v by subtracting the actual value from the command value. The speed difference value $v_e$ is connected to the input of the speed controller 1, whereby the controller aims to eliminate the difference value and thus make the web speed to equal the command value.

FIG. 1 further shows how a torque disturbance $M_h$ is connected to an adder unit 5. A torque $M_{mot}$ which is acting on the shaft of the motor is connected to the other input of the adder unit 5. In a real system, the torque disturbance affects the motor directly via the load, reducing a resultant torque. From the point of view of control technique, the torque disturbance can, however, be added as described above, in which case the output of the adder unit 5 is the resultant torque. The combination 3 of the motor and the roll shown in the figure is expressed as a transfer function $$\frac{r}{Js},$$

where r is the radius of the roll, and J the combined moment of inertia of the roll and the motor. Operator s is an integrator operator related to the transfer function, whereby the input of the combination 3 of the motor and the roll being the torque, a web speed v is obtained as the output.

According to the invention, the arrangement comprises a compensator 6 which determines an estimated torque disturbance and, by means of the torque compensation of the previous cycle, the magnitude of a new torque compensation. Here, a 'cycle' refers to the process which causes the torque disturbance for the compensation of which the torque compensation is used. For instance, a cleaning doctor pressing against a roll is a cycle. The web speed v serves as the input of the compensator 6, and as an initial value, an estimate of the combined moment of inertia J of the load and the motor should be known. The output of the compensator 6 is connected to the input of an adder unit 7. The output of the speed controller 1 is connected to the other input of the adder unit 7, in which case a torque command $M_o$ to be connected to the torque controller input is obtained from the adder unit output.

The adaptation of the arrangement starts when information is received that a transient phase is about to begin. Such information can be received from the process computer controlling the event that causes a load change. The information on a beginning of a transient phase, i.e. a cycle, is typically obtained well in advance before the actual load change takes place. After the reception of a signal indicating that a cycle is about to begin, the compensator starts compensating by adding a torque compensation $M_k$ from the estimated torque disturbance determined during the previous cycle to an output signal $M_v$ of the speed controller, whereby the torque command $M_0$ is provided for the torque controller 2. The torque compensation $M_k$ is a sequence of numbers determined at regular intervals and located in the memory of the compensator, from which the torque compensation $M_k$ can be added to the output $M_v$ of the speed controller at the same intervals.

In accordance with a preferred embodiment of the invention, the compensator realizes the equation $M_k(k+1)= aM_k(k)+(1-a)M_h(k)$, in which case the compensation (k+1) used during the next cycle is computed from the compensation used during the cycle (k) and the estimated torque disturbance. The adaptation coefficient a in the equation controls the speed of the adaptation. When the value of a is low, the value history is much more unimportant in the computation than the estimate of the torque disturbance. Consequently, the compensator adapts faster to a situation that has possibly changed. In the opposite case when the value of a is high, the adaptation is slow. The factor a can obtain values between 0 and 1. Previous estimated torque disturbances that are weighted in a desired manner are thus used as the torque compensation.

Since the compensation is determined by estimating the torque disturbance as a function of time, the method adapts to an arbitrary-shaped torque disturbance. As shown in FIG. 1, an estimate $$M_h = M_{mot} - \frac{J}{r}\frac{dv}{dt},$$

can be provided for the torque disturbance, from which estimate the torque disturbance can be estimated in a simple manner. In the equation, $M_{mot}$ is the magnitude of an instantaneous torque that is acting on the shaft of the motor and obtained from the power feeding device. This information is obtained directly from the power feeding device; hence, the magnitude of the torque disturbance obtains a reliable value. If the adaptation coefficient a is set to be zero in the torque compensation determination, the compensator only uses the torque disturbance estimate determined during the previous cycle as the torque compensation.

Furthermore, the torque compensation does not necessarily have to be the same from one cycle to another, but it can vary. If the changes are sufficiently small, the compensator is able to adapt to the situation during the change, and no great fluctuations can be detected in the speed response. If the operation of the system changes drastically between two cycles, it takes the compensator a couple of cycles to adapt; this also applies when there is no value history available in an initial situation.

In the transient phase, the disturbance can change arbitrarily. The memory capacity available restricts the length of the transient phase since the estimate computed as a function of time at regular intervals must be stored in the memory for the next cycle.

According to an embodiment of the invention, there is a waiting period of a predetermined length after the reception of the control signal indicating the beginning of the transient phase before the steps performed during the transient phase are started. The control signal is typically obtained long before the actual load change occurs. Hence, in order to save memory, it is preferable to wait for a predetermined, adjustable period before starting the adaptation phase.

In accordance with another embodiment of the invention, the angular speed of the load is low-pass-filtered before computing the external torque disturbance. To filter the angular speed signal is preferable because while computing the external torque disturbance, a derivation operation is performed to the angular speed signal, which operation emphasizes abrupt changes.

Further, according to an embodiment of the invention, the output torque of the device controlling the motor is low-pass-filtered before computing the estimate of the external torque disturbance, whereby the torque estimate can be made to change in a moderate way.

According to an embodiment of the invention, the value $(M_k(k+n))$ of the torque compensation related to a predetermined next moment is used as the torque compensation. The small delay generated as a result from the low-pass-filtering of the angular speed and the torque can thus be compensated by providing the torque compensation with a small time advance.

In accordance with an embodiment of the invention, a new value is determined for the adaptation coefficient a. It is preferable to redetermine the value of the adaptation coefficient when changes in the magnitude and timing of the torque disturbance can be expected. If the compensator is accurately adapted to a current torque disturbance, the use of value history can thus be reduced by lowering the value of the coefficient, and a predetermined value of the torque disturbance can be used as the compensation.

It is obvious to those skilled in the art that the basic idea of the invention can be implemented in many ways. The invention and its embodiments are thus not restricted to the examples described above but they can vary within the scope of the claims.

What is claimed is:

1. A method of adaptively compensating for a transient phase causing a load change, particularly in connection with an electric motor drive which comprises a motor, the shaft of the motor being connected to a load having a known moment of inertia; a device, such as an inverter, to control the motor, a torque controller being arranged in connection with the device; and a speed controller arranged to control the speed of the motor, the method comprising the steps of:

receiving an indication of the start of the transient phase which causes the load to change;

determining, during the load change only, an estimate ($M_h$) for an external torque disturbance which causes the load change, and employing the estimate ($M_{hl}$) determined during the previous load change for compensating for the external torque disturbance in controlling the torque of the motor.

2. A method as claimed in claim 1, wherein said employing step comprises the steps of determining a torque compensation ($M_k$) on the basis of one estimate determined during the previous load change, and employing the torque compensation ($M_k$) for compensating for the external torque disturbance in controlling the torque of the motor.

3. A method as claimed in claim 1, wherein said employing step comprises the steps of determining a torque compensation ($M_k$) on the basis of two or more estimates determined during the previous load changes, and employing the torque compensation ($M_k$) for compensating for the external torque disturbance in controlling the torque of the motor.

4. A method as claimed in claim 1, comprising the steps of determining the torque compensation on the basis of the estimated torque disturbance ($M_h(k)$) and the torque compensation ($M_k(k)$) to be employed by the equation $M_k(k+1)=aM_k(k)+(1-a)M_h(k)$, where the magnitude of the adaptation coefficient (a) can be set to be between 0 and 1.

5. A method as claimed in claim 1, wherein the determination of the estimate of the external torque disturbance comprises the steps of determining an angular speed ($\omega$) of the load, and computing the estimate of the external torque disturbance as a difference of the output torque ($M_{mot}$) of the device controlling the motor and the countertorque of the load by the equation $M_h=M_{mot}-J\, d\omega/dt$, where J is the moment of inertia of the load, and $\omega$ is the angular speed of the load.

6. A method as claimed in claim 5, further comprising the step of low-pass-filtering the angular speed of the load before computing the estimate.

7. A method as claimed in claim 5, further comprising the step of low-pass-filtering the output torque of the device controlling the motor before computing the estimate of the external torque disturbance.

8. A method as claimed in claim 1, wherein a value ($M_k(k+n)$) of the torque compensation related to a predetermined next moment is used as the torque compensation.

9. A method as claimed in claim 1, further comprising the step of changing the magnitude of the adaptation coefficient.

10. An arrangement for adaptively compensating for transient load changes an electric motor having a shaft connected to a load having a known moment of inertia comprising: a device for receiving an indication of the start of a transient load change for controlling the motor including, a torque controller for producing an output torque; and a speed controller arranged to control the speed of the motor; an adder, the speed controller receiving as its input a difference ($v_e$) of a speed command ($v_o$) and an actual value (v) of the speed of the motor from the adder unit; and a compensator arranged to determine during a load change only a torque compensation ($M_k$) for compensating for an external torque disturbance on the basis of a torque disturbance ($M_h$) to which the load is subjected, the output torque ($M_{mot}$) of the device controlling the motor, and a moment of inertia (J) and an angular speed ($\omega$) of the load.

11. A method of adaptively compensating for load changes in an electric drive wherein the shaft of the motor is connectable to a load having a known moment of inertia comprising the steps of:

receiving an indication of the start of the transient phase which causes the load to change;

determining, during a load change only, an estimate ($M_h$) of an external torque disturbance which causes the corresponding load change, and controlling the torque of the motor by employing the estimate ($M_h$) determined during the corresponding load change for compensating for the external disturbance.

12. Apparatus for adaptively compensating for transient load changes, in an electric motor drive wherein a motor has a shaft connectable to a load having a known moment of inertia comprising:

means for receiving an indication of the start of a load change for controlling the motor;

a compensator for determining during such load change only a torque compensation ($M_k$) on the basis of a torque disturbance ($M_h$) to which the load is subjected, an output torque ($M_{mot}$), and a moment of inertia (j) and an angular speed ($\omega$) of the load, and applying the torque compensation of the motor.

13. A method of adaptively compensating for periodic transient phases causing load changes in an electric motor drive wherein the motor has a shaft connected to a load having a known moment of inertia; control means operatively coupled to the motor produces a torque signal; and a speed controller operatively coupled to the control means produces a speed control signal for controlling the speed of the motor, comprising the steps of:

determining, during the load change only, an estimate for an external torque disturbance which causes the load to change during the corresponding transient phase;

employing a compensator responsive to the estimate determined during the previous transient phase for producing a compensating signal for the control means to control the torque of the motor; and providing inputs to the compensator based upon the actual motor speed and the moment of inertia.

* * * * *